(12) United States Patent
Munk-Nielsen et al.

(10) Patent No.: US 11,208,339 B2
(45) Date of Patent: Dec. 28, 2021

(54) TREATMENT OF WASTEWATER

(71) Applicants: Krüger A/S, Søborg (DK); Danmarks Tekniske Universitet, Kgs. Lyngby (DK)

(72) Inventors: Thomas Munk-Nielsen, Rønne (DK); Morten Grum, Brønshøj (DK); Peter Tychsen, Copenhagen (DK); Henrik Andreas Rønnow Thomsen, Copenhagen (DK); Henrik Madsen, Kgs. Lyngby (DK); John Bagterp Jørgensen, Kgs. Lyngby (DK); Rasmus Fogtmann Halvgaard, Kgs. Lyngby (DK)

(73) Assignees: KRÜGER A/S, Søborg (DK); DANMARKS TEKNISKE UNIVERSITET, Kgs. Lyngby (DK)

(*) Notice: Subject to any disclaimer, the term of this patent is extended or adjusted under 35 U.S.C. 154(b) by 257 days.

(21) Appl. No.: 16/327,942

(22) PCT Filed: Aug. 25, 2017

(86) PCT No.: PCT/EP2017/071445
§ 371 (c)(1),
(2) Date: Feb. 25, 2019

(87) PCT Pub. No.: WO2018/037116
PCT Pub. Date: Mar. 1, 2018

(65) Prior Publication Data
US 2020/0262726 A1    Aug. 20, 2020

(30) Foreign Application Priority Data
Aug. 26, 2016  (EP) .................................. 16185878

(51) Int. Cl.
*C02F 3/00* (2006.01)
*C02F 1/52* (2006.01)

(52) U.S. Cl.
CPC ............ *C02F 3/006* (2013.01); *C02F 1/5209* (2013.01); *C02F 2209/006* (2013.01);
(Continued)

(58) Field of Classification Search
None
See application file for complete search history.

(56) References Cited

U.S. PATENT DOCUMENTS 5,252,214 A * 10/1993 Lorenz .................. C02F 3/1215
210/605
9,747,544 B2 * 8/2017 Wan ...................... G06N 3/0436
(Continued)

FOREIGN PATENT DOCUMENTS

WO      0134919 A1    5/2001
WO    2015044440 A1    4/2015

OTHER PUBLICATIONS

Derwent Abstract of IN201631009489A to Chaudhuri (downloaded 2021) (Year: 2021).*
(Continued)

*Primary Examiner* — Chester T Barry
(74) *Attorney, Agent, or Firm* — Coats & Bennett, PLLC

(57) ABSTRACT

The present invention provides a method of treating wastewater in a wastewater system. The wastewater system comprises a treatment plant comprising a treatment space and a sewer system comprising a sewer space. The treatment plant further comprises a treatment inlet for supplying wastewater to the treatment system from the sewer system. The method comprises the step of: providing a treatment parameter being significant for purification of wastewater in the treatment plant, determining an actual spare plant capacity indicating
(Continued)

an amount of wastewater which can be supplied to the treatment space, and determining an actual spare wastewater storage volume indicating an amount of wastewater which can be retained in the sewer space. The amount of wastewater supplied through the treatment inlet to the treatment plant is varied based on the treatment parameter, the actual spare plant capacity, and the actual spare wastewater storage volume.

21 Claims, 2 Drawing Sheets

(52) U.S. Cl.
CPC ...... *C02F 2209/08* (2013.01); *C02F 2209/10* (2013.01); *C02F 2209/14* (2013.01); *C02F 2209/15* (2013.01); *C02F 2209/16* (2013.01); *C02F 2209/18* (2013.01); *C02F 2209/22* (2013.01); *C02F 2209/40* (2013.01); *C02F 2305/06* (2013.01)

(56) References Cited

U.S. PATENT DOCUMENTS

| | | | | |
|---|---|---|---|---|
| 2007/0102335 A1* | 5/2007 | McKinney | .............. | C02F 3/302 210/194 |
| 2010/0252499 A1* | 10/2010 | Janssen | .................. | C02F 3/302 210/614 |
| 2012/0012189 A1* | 1/2012 | Janson | .................. | C02F 3/1268 137/13 |
| 2012/0222994 A1* | 9/2012 | Smaidris | ................ | C02F 3/006 210/97 |
| 2013/0233809 A1* | 9/2013 | Graham | .................... | C02F 3/26 210/758 |
| 2014/0238932 A1* | 8/2014 | Erdogan | ................ | C02F 3/121 210/605 |
| 2016/0200608 A1* | 7/2016 | Tharp | ....................... | C02F 3/12 210/620 |
| 2020/0262726 A1* | 8/2020 | Munk-Nielsen | .......... | E03F 7/00 |

OTHER PUBLICATIONS

Bechmann, et al., Grey-box modelling of pollutant loads from a sewer system, Urban Water 1 (1999), p. 71-78 (Year: 1999).*

Wiese, J., et al., "Integrated real-time control for a sequencing batch reactor plant and a combined sewer system", Water Science & Technology, vol. 52, No. 5, pp. 179-186 (Jan. 1, 2005).

Schütze, Manfred, et al., "Real time control of urban wastewater systems—where do we stand today?", Journal of Hydrology, vol. 299, No. 3-4, pp. 335-348 (Dec. 1, 2004).

* cited by examiner

TREATMENT OF WASTEWATER

This application is a U.S. National Stage Application of PCT Application No. PCT/EP2017/071445, with an international filing date of 25 Aug. 2017. Applicant claims priority based on European Application No. 16185878.2 filed 26 Aug. 2016. These applications are incorporated herein by reference in their entirety.

FIELD OF THE INVENTION

The present invention relates to a method of treating wastewater in a wastewater system, and to a wastewater system. The wastewater system comprises a treatment plant comprising a treatment space and a sewer system comprising a sewer space. The treatment plant further comprises a treatment inlet for supplying wastewater to the treatment system from the sewer system.

BACKGROUND OF THE INVENTION

Traditionally, a treatment plant is operated by increasing the effluent quality of the wastewater after treatment. Furthermore, the sewer system is typically operated by transporting wastewater to the treatment plant.

Generally, the costs of operating the wastewater system are high. Furthermore, the systems are traditionally dimensioned so that they in the majority part of time are only exposed to a low percentage of the amount of wastewater for which the plant is dimensioned in order to cope with the varying amount of wastewater.

Prior art document WO 01/34919 discloses a method and an apparatus for diurnally storing and releasing municipal sewage in its conveyance network of sewers and interceptor piping to affect a reduction in peak energy demand and on-peak energy usage at the wastewater treatment plant. The apparatus comprises a sewer segment having an upstream section and a downstream section. The sewer segment also contains a liquid portion and a gaseous portion. A control means is located between the upstream section and the downstream section of the sewer segment.

"Integrated real-time control for a sequencing batch reactor plant and a combined sewer system" by J. Wiese et al. from Water Science & Technology, Vol. 52, No. 5, pp. 179-186, IWA Publishing 2005 discloses an integrated real-time control system concept for Sequencing Batch Reactor (SBR) plants in simulation and in full-scale. New rule-based control strategies on the SBR plant have been developed based on an off-line simulation study from an 11 days monitoring campaign. In one of the new control strategies, the duration of the SBR cycle is changed; i.e. the time between filling of the SBR reactors to the end of the treatment process. The control strategy comprises a shift from a dry weather cycle to a wet weather dependent on water level data and rainfall data. With the improved control, a number of absolute flow thresholds have been introduced dependent of cycle of operation at the plant. The optimisation to handle a higher hydraulic capacity is done internally at the plant by use of buffer tank and with no feedback from the plant to the sewer system and with no on-line coordination between the plant and the sewer system.

DESCRIPTION OF THE INVENTION

It is an object of embodiments of the invention to provide an improved method of treating wastewater.

It is a further object of embodiments of the invention to provide a treatment method being dynamically adaptable to an actual spare plant capacity.

It is an even further object of embodiments of the invention to provide a treatment method being dynamically adaptable to an actual spare wastewater storage volume.

According to a first aspect, the invention provides a method of treating wastewater in a wastewater system; the wastewater system comprising a treatment plant comprising a treatment space and a sewer system comprising a sewer space, the treatment plant further comprising a treatment inlet for supplying wastewater to the treatment system from the sewer system; the method comprising the step of:
  providing a treatment parameter being significant for purification of wastewater in the treatment plant,
  determining an actual spare plant capacity indicating an amount of wastewater which can be supplied to the treatment space,
  determining an actual spare wastewater storage volume indicating an amount of wastewater which can be retained in the sewer space, and
  varying the amount of wastewater supplied through the treatment inlet to the treatment plant based on the treatment parameter, the actual spare plant capacity, and the actual spare wastewater storage volume.

By varying the amount of wastewater supplied through the treatment inlet to the treatment plant based on the treatment parameter, the actual spare plant capacity, and the actual spare wastewater storage volume, the operation of the wastewater system can be dynamically adapted to the actual state of each of the parameters and thus optimised in dependency of these parameters. This is contrary to traditional operation of wastewater systems where wastewater is treated without delay when reaching the treatment plant.

It should be understood, that the degree to which each of the parameters is used as basis for the variation of the amount of wastewater may vary.

Surprisingly, control based on a combination between the treatment parameter, the actual spare plant capacity, and the actual spare wastewater storage volume can increase the average throughput when compared to a method where only one parameter is used. Further, it can facilitate an improved ratio between effluent quality and costs.

In the context of the present invention, the term 'wastewater' should be understood as water originating from different sources, such as from domestic, industrial, commercial, and/or agricultural activities, surface runoff, and rain, or combinations thereof.

The treatment plant may comprise a treatment space including at least one tank and a plurality of pipes. As an example, the treatment plant may comprise one or more process tanks, and may comprise a clarification tank, a digester, a retention tank, etc. It should be understood, that the number and types of tanks may differ from one embodiment of the invention to another embodiment of the invention.

In the context of the present invention, the term 'retention tank' should be understood as a tank for storage of wastewater before, after, or during treatment of the wastewater. In the retention tank, the wastewater may be stored while waiting for treatment, waiting for further treatment, or waiting to be let out of the treatment plant. The retention period may depend on different parameters, such as the amount of wastewater, the actual spare plant capacity, the actual spare wastewater storage volume, at least one treatment parameter, weather data, etc.

The sewer system may comprise a sewer space which may include a plurality of sewer pipes and possibly at least one detention tank configured to retain wastewater in the sewer system, e.g. during heavy rain. It should be understood, that the sewer pipes are typically closed tubes which may be of different size and/or shape. However, possibly some of the sewer pipes may be open channels.

In the context of the present invention, the term 'detention tank' should be understood as a tank for storage of wastewater in the sewer system. Consequently, wastewater may be retained in the sewer space in pipes and/or in a detention tank or detention tanks.

As an example, the sewer pipes may be used for retention of wastewater by closing a valve or by shutting off a pump.

Thus, the purpose of a retention tank in the treatment plant and a detention tank in the sewer space may be the same; i.e. to store an amount of wastewater.

The treatment plant comprises a treatment inlet for supplying wastewater from the sewer system to the treatment plant. The inlet may comprise at least one pipe to allow a flow of wastewater to be treated into the treatment plant. It should however be understood, that the inlet may comprise a plurality of pipes to allow a plurality of flows, e.g. from different directions, to the treatment plant. In embodiments having an inlet comprising a plurality of pipes, the flows may be directed to the same tank at the treatment plant. Alternatively, the flows may be directed to different tanks at the treatment plant. In an even further alternative embodiment, the inlet comprises a switch structure so as to allow the flow(s) to be directed to different tanks.

The treatment parameter specifies a change of the wastewater from the inlet to the outlet of treatment plant, and it may particularly express a content of biological contaminant, such as $NH_4$—N.

The treatment parameter may be provided by measuring a content at one or more locations in the wastewater system; i.e. in the sewer system and/or in the treatment plant. In one embodiment, a single measurement is sufficient, whereas in another embodiment two measurements are carried out at two locations, e.g. separated in the flow direction, such as at the inlet and at the outlet. It should be understood, that a treatment parameter may be stored when provided, whereby the amount of wastewater supplied may also be varied based on historical values of one or more treatment parameters.

The treatment parameter may also be provided by continuously measurement of the treatment parameter in question, thereby providing an online measured treatment parameter.

In the context of the present invention, the term 'historical values' and 'historical data' should be understood as values and data being measured, determined, estimated, or otherwise provided and subsequently stored for later use. Thus, the wastewater system may comprise a storage unit for storage of values and/or data, and a control structure configured to vary the flow of wastewater from the sewer system to the treatment plant. The control structure may be configured to read values from the storage unit and configured to vary the flow based on these stored values.

It should be understood, that more than one treatment parameter significant for purification may be used when varying the amount of wastewater supplied. If more than one treatment parameter is used, the treatment parameters may be provided by different means. As an example, one treatment parameter may be provided by online measurements, whereas another may be provided as historical data, and another provided e.g. by a single measurement each day. Measured data may be analysed before providing the treatment parameter. It should however also be understood, that a measurement may provide a treatment parameter without any subsequent analysis.

The actual spare plant capacity which indicates an amount of wastewater which can be supplied to the treatment space may depend on the spare volume in the plant; i.e. a spare volume to which wastewater can be supplied. The spare volume may be located in one or more of the tanks and/or located in pipes at the treatment plant.

Furthermore, the actual spare capacity may depend on the purification capacity in the treatment plant, such as biological capacity and chemical capacity. The purification capacity may e.g. depend on the actual metabolism rate of the biomass/micro-organisms, the amount of biomass/micro-organisms, the organic load contained in the wastewater, the nutrient load in the wastewater, etc.

Additionally, the actual spare capacity may depend on the hydraulic capacity in the treatment plant. The hydraulic capacity may be defined as a flow per unit of time, such as $m^3$ per hour, and may include information about settling properties of biomass, sludge escape, and bottlenecks. The hydraulic capacity may vary over time. As an example, a high flow per unit of time may have to be avoided in order to avoid sludge escape. By 'sludge escape' should be understood that sludge is flushed out of e.g. a clarification tank instead of being settled.

The actual spare wastewater storage volume indicating an amount of wastewater which can be retained in the sewer space may comprise a spare volume in one or more detentions tanks and/or may comprise a spare volume in one or more of the sewer pipes.

In one embodiment, purification of the wastewater may comprise at least one of biological and chemical removal of nutrients. As an example chemical removal of phosphorus may be carried out by adding one or more chemical to the wastewater during treatment hereof. Biological removal of nutrients may as an example comprise a step of metabolizing suspended and soluble organic matter contained in the wastewater. The step may be carried out by use of micro-organisms.

The treatment parameter may be selected from a group consisting of: Total-N, $NH_4$-N, $NH_4$-N+$NO_3$-N, $N_2O$, Total-P, $PO_4$-P, COD (Chemical Oxygen Demand), BOD (Biochemical Oxygen Demand), TOC (Total Organic Carbon), TSS (Total Suspended Solids), MLSS (Mixed Liquor Suspended Solids), DO (Dissolved Oxygen), turbidity, OUR (Oxygen Uptake Rate), sludge blanket, settling properties, such as SVI (Sludge Volume Index), sludge composition, e.g. based on DNA sequencing analysis technology, and combinations thereof.

Thus, the treatment parameter may be provided by measuring a content of or determining one or more of the above parameters at one or more locations in the wastewater system.

Furthermore, a flow may be measured or determined at one or more locations in the sewer system. An outlet flow from the treatment plant, an outlet flow from one or more households in the catchment area to the wastewater system, etc. may alternatively or additionally be measured. If measuring or determining one or more flows, these flow(s) may be used when determining the actual spare plant capacity and/or the actual spare wastewater storage volume.

The step of varying the amount of wastewater supplied through the inlet may further be based on energy consumption in the wastewater system. As an example, an amount of wastewater may be retained in the sewer space to equalize the daily variation of wastewater provided to the sewer system. Consequently, energy consumption for pumping and/or for aeration may be equalised or even lowered since heavy peaks may be avoided.

It should be understood, that equalising the amount of wastewater supplied may not only save energy when avoiding heavy peaks. The avoidance of periods with very low supply of wastewater and thus very low loads may also improve the efficiency of the wastewater system, as periods with low loads may be ineffective as some of the processes in the treatment plant may have to run at a certain level, thus causing a higher energy consumption than expected only based on the load.

Furthermore, equalising the amount of wastewater supplied to the treatment plant may improve the conditions for the biomass and thus increase the biological capacity of the plant.

By equalising the amount of wastewater supplied during day and night, especially the slowly growing bacteria AOBs (Ammonia Oxidising Bacteria) and NOBs (Nitrate Oxidising Bacteria) may improve the total nitrification process (conversion of $NH_4$—N to $NO_3$—N) in a nitrogen removing treatment plant. These autotropic bacteria tend to adapt to the average ammonium load and by a high peaks they may have difficulties in carrying out the nitrification process at sufficient speed. Consequently, the outlet may comprise too high values of ammonium or nitrate during hours with increased supply of wastewater; i.e. during peak hours. However, the equalisation may improve the effluent quality by improving the conditions for the autotropic bacteria.

Additionally, the step of varying the amount of wastewater supplied through the inlet may further be based on variable costs of energy consumption. As an example, the energy costs may vary during day and night, e.g. for behaviour regulation. Consequently, the running costs for the wastewater system may be lowered by increasing e.g. pumping and aeration during periods where the costs are low and lowering pumping and aeration during periods where the energy costs are high. This may be done by varying the amount of wastewater supplied through the inlet.

The amount of wastewater supplied to the treatment plan may as an example be varied by retaining at least a part of the wastewater in the sewer system, such as in pipes and/or in retention tank(s). This may be of particular interest during dry weather or during minor rain events.

It should be understood, that not only pumping and aeration can be affected, as the step of varying the amount of wastewater may also influence other energy consuming features in the wastewater system.

It should be understood, that the step of varying the amount of wastewater supplied may be carried out in rainy weather, and that the method may further comprising a step of continuing the step of varying the amount of wastewater supplied until dry weather occurs.

Subsequently, the step of varying the amount of wastewater supplied may be continued during dry weather. Thus, the method of treating wastewater may be carried out both in rainy weather and during dry weather.

In an alternative embodiment, the step of varying the amount of wastewater may only be carried out during dry weather and during minor rain events. And in a further alternative embodiment, the step of varying the amount of wastewater may only be carried out during dry weather.

In the context of the present invention, the term "dry weather" should be understood as a weather condition where substantially no rainfall is detected. It should further be understood, that a dry weather condition may be present at the treatment plant even though minor rainfall is detected at one or more locations at the sewer system.

Consequently, the step of varying the amount of wastewater may in one embodiment only be carried out during dry weather/minor rain events, if the dry weather/minor rain events is/are detected at the treatment plant or at the treatment plant and at the sewer system.

A minor rain event may be defined as a rainfall where the precipitation rate is below a predefined threshold value. The predefined threshold value may as an example depend on the size of the treatment plant, the type of treatment plant, the size of the sewer system, the layout of the sewer system, such as number and/or size of detention tanks, etc.

In one embodiment, the predefined threshold value may be a precipitation rate below 5 mm, such as 2.5 mm per hour.

The effluent quality of the wastewater after treatment may have to fulfil a threshold value. It should be understood that the threshold value may comprise a plurality of values, each defining a threshold for a specific parameter, such as a threshold value for $NH_4$—N, $NO_3$—N, $N_2O$, Total-P, $PO_4$—P, COD, etc.

It should further be understood, that the threshold value(s) may vary, e.g. during day and night, from season to season, etc. Some threshold values may be absolute values which cannot be exceeded, whereas other threshold value may comprise an average value over a predefined time period, e.g. 2 hours, 24 hours, or an average of a predefined number of samples over a year, where this threshold value cannot be exceeded during the predefined time period.

In one embodiment, the method may further comprise a step of monitoring effluent quality of the wastewater after treatment in the treatment plant. And the step of varying the amount of wastewater supplied through the inlet may further be based on the effluent quality. As an example, the amount of wastewater supplied may be lowered, if the amount of biomass is too low to ensure a sufficient effluent quality.

Furthermore, costs may be associated with the effluent quality of the wastewater after treatment in the treatment plant. The costs may typically be higher, the lower the effluent quality is. To reduce these costs, the step of varying the amount of wastewater supplied through the inlet may further be based on the costs related to the effluent quality. Consequently, the amount of wastewater supplied through the inlet may be lowered if the effluent quality is poor to thereby reduce the costs.

To further reduce the costs, the method may further comprising a step of determining a risk of exceeding an effluent threshold value, and the step of varying the amount of wastewater supplied through the inlet may further be based on the determined risk.

By determining a risk of exceeding the threshold value instead of measuring the effluent quality after treatment, it may be possible to adjust the amount of wastewater supplied before the threshold value is exceeded and thus proactively vary the supply. The risk may be determined based on measurements, forecasts, historical data, and combinations hereof, etc.

The treatment plant may comprise a digester for production of biogas. The produced biogas may be sold or may be used for production of electricity and/or heat. The produced electricity and/or heat may be sold or may be used at the treatment plant. In one embodiment, the step of varying the amount of wastewater supplied through the inlet may further be based on the amount of biogas produced in the digester. If the biogas price is variable, it may be an advantage to increase the amount of wastewater supplied prior to periods with high biogas prices. It may be a further advantage if the time delay associated with the production of biogas relative to the wastewater supplied can be taken into account. Alternatively or additionally, it may be an advantage to increase biogas production when heat and/or electricity is needed at the treatment plant.

The step of varying the amount of wastewater supplied through the inlet may further be based on an amount of sludge produced in the treatment plant. As an example, it may be an advantage to decrease the amount of wastewater supplied during periods where the sludge capacity at the treatment plant is reached or may be reached within a short time periods, as it may be costly and/or time consuming to dispose the excess sludge, e.g. at surrounding fields.

As production of sludge requires energy, it may be an advantage if the step of varying the amount of wastewater supplied through the inlet is further based on sludge treatment costs.

To increase the purification capacity, such as the biological capacity and/or chemical capacity, the method may further comprise a step of dosing an amount of at least one substance to the treatment plant. Furthermore, the method may comprise a step of determining the amount. The step of varying the amount of wastewater supplied through the inlet may in one embodiment further be based on the determined amount of the at least one substance.

As an example, the substance may be selected from a group consisting of: precipitation chemical, iron, aluminium, external carbon, polymer, nutrients, base, acid, and combinations thereof. It should however be understood, that other substances may also be used.

A precipitation chemical, e.g. iron in the form of ferric chloride or aluminium in the form of poly-aluminium chloride, may be added to increase the removal of phosphorous.

Base or acid may be added to change the pH value of the wastewater or to change the pH value in one or more tanks, such as in a process tank, as the composition of wastewater and the impact of different treatment processes may change the pH value so that the purification efficiency is reduced. In order to achieve the best pH conditions for optimal purification processes, base may be added to increase the pH and acid may be added to decrease the pH value.

Nutrients in form of nitrogen or phosphorus-containing substances may be added to avoid a nutrient deficiency in the biomass in the biological treatment processes. Such deficiency may be caused by a lack of nitrogen or phosphorous in incoming wastewater.

Additional carbon may be added to avoid a carbon deficiency in the biomass in the biological treatment processes or for speeding up biological treatment processes e.g. biological removal of nitrate and biological removal of phosphorous.

The additional carbon may be added in form of an external carbon dosage or internal carbon from wastewater.

External carbon may be added in the form of methanol, ethanol or other substance with carbon, e.g. carbon rich wastewater from industry.

Addition of internal carbon from the wastewater may be achieved by bypassing a part of the wastewater a primary treatment and forwarding it directly to a secondary treatment.

Typically, primary treatment may comprise settling of sludge, whereas secondary treatment may typically comprise biological removal of nutrients.

In case of heavy rain, the amount of wastewater in the wastewater system may increase rapidly. At least a part of the increased amount of wastewater may be retained in the sewer pipes and/or in one or more retention tanks and/or in one or more detention tanks.

Dependent on the amount of rain and on the amount on wastewater already present in the system, there may be a risk of overflow from the retention tank(s) and/or detention tank(s). The method may comprise a step of determining a risk of overflow in the wastewater system, e.g. based on information on the amount of rain and/or on the amount on wastewater already present and/or forecast data for the rain and/or forecast data for growth or decrease of the amount of wastewater not originating from rain and/or on historical data, e.g. containing data on the latest rainfall, the amount of wastewater present, the actual spare plant capacity, etc.

Thus, the step of varying the amount of wastewater supplied through the inlet may further be based on the determined risk. As an example, the amount of wastewater supplied through the inlet may be increased even though it may considerable increase the energy use for e.g. pumping and/or aeration to thereby at least partly empty at least one of the retention tank(s) and/or the detention tank(s) to provide space for the rainwater.

By varying the amount of wastewater supplied through the inlet, and thus reducing the risk of overflow, it may additionally be possible to lower the risk of contamination of the surroundings as at least a larger amount of the wastewater may be retained in the wastewater system.

In a simple embodiment, the step of determining the actual spare plant capacity may be based on a time schedule. Thus, the capacity may be determined based on information on typical daily variations, and this information may be used as basis for the variation of the amount of wastewater supplied to the treatment plant.

In an alternative embodiment, the step of determining the actual spare plant capacity may be based on prediction of at least one of the amount of wastewater treated and the amount of wastewater supplied through the treatment inlet. The prediction(s) may include information on occupancy behaviour, such as typical day and night variations of production of wastewater, forecast information which may include weather forecasts and e.g. forecast relating to events which may be attended by several people, and which may thereby result in an increased amount of wastewater produced. The type of events may include festivals, town fairs, exhibitions, etc.

Additionally, the step of determining the actual spare plant capacity may be based on information of/estimation of the concentration of effluents in the wastewater supplied to the treatment plant, as a high concentration of effluents may, as an example, require a higher level of aeration. This may be of particular interest during heavy rain, where the high concentration of effluents may be supplied to the treatment plant. Especially if the heavy rains occurs after a longer period without rain; i.e. during a so called "first flush".

Furthermore, the method may comprise a step of mathematically modelling of at least one of treatment parameter, actual spare plant capacity, and actual spare wastewater storage volume by use of a mathematical model, and the step of varying the amount of wastewater supplied through the inlet may further be based on the mathematical modelling.

The mathematic modelling may comprise the use of methodologies for stochastic dynamical modelling using grey-box technologies which may also be called semi-physical, transparent, mechanistic, or surrogate modelling. Consequently, it may be possible to bridge the gap between physical and statistical modelling, as combined information from physics and information from data may be used by the model. The grey-box technologies may be based on real-time data; i.e. data which is measured and subsequently transferred to the mathematical model for modelling without any substantial delay.

The models may be formulated such that 1) the models may be able to run fast enough for real-time applications, 2) information from e.g. time series of flow, rain gauges, and other factors from forecast information and/or historical data can be utilized for operational purposes, and 3) the same model may be used for both forecasting, control, simulation, risk analysis, optimization, and scenario generation.

Alternative mathematical models may be based on deterministic modelling, may employ neural networks, and/or machine learning. It should be understood, that other types of modelling may also be applied.

It should be understood, that the step of mathematically modelling the treatment parameter may include online measurements of the treatment parameter. Thus, the mathematical model may continuously receive measured data to thereby provide a treatment parameter which is based on real time values.

Thus, it should be understood, that the step of mathematically modelling the treatment parameter may take place in a way which assimilate information in online measurements of the treatment parameter. In order to enable such a real-time adaptation of the mathematical model to the actual purification of wastewater, the step of mathematical modelling may include a step of calibrating the mathematical model based on online measurements of the treatment parameter(s) or based on online measurements of other parameters relating to the treatment plant and/or sewer system. Consequently, the mathematical models may be self-calibrated or auto-tuned to the new and most relevant data.

The new and most relevant data may as an example be provided within 10 minutes, 30 minutes, 2 hours, 6, hours, 12 hours, 24 hours, or 48 hours intervals. The time interval may be dependent on the type of data selected for the mathematical model and/or dependent on e.g. the size of the treatment plant, the type of treatment plant, the size of the sewer system, the layout of the sewer system, such as number and/or size of detention tanks, etc. It should further be understood, that the time interval may be varied for a specific parameter to further calibrate the mathematical model(s).

To enable adaptation of the mathematical model to the actual purification of wastewater, the step of mathematically modelling may comprise a step of calibrating the mathematic model based on online measurements of the treatment parameter, cf. above. Consequently, the mathematical models may be self-adjusting. The calibration step may in one embodiment be performed continuously.

Additionally and/or alternatively, at least one of the steps of providing a treatment parameter, determining the actual spare plant capacity and determining the actual spare sewer volume may be based on forecast information. It should be understood, that when providing the forecast information it may include and/or may be based on historical data.

The forecast information may be based on information from a group consisting of: information from one or more rain gauges, information from weather radar(s), weather forecasts, temperature, satellite data, one or more flow measurements in the sewer system, one or more signals from one or more pumping stations arranged in the sewer system, and combinations thereof.

It should further be understood, that forecast information may be created by different means, such as point forecast (e.g. the most likely values), confidence intervals, quantiles, scenarios, and/or simulations. The forecast information may further be used when determining the risk of overflow or in relation to other risk analysis in relation to the treatment of wastewater.

The mathematic models may further be used for Model Predictive Control (MPC) which is an advanced method for process control. The MPC is a multivariable control algorithm that uses the mathematic models of the wastewater system to predict its behaviour and plan the optimal control.

The MPC may continuously solve a mathematical optimization problem to provide a closed loop feedback and adapt to recent model changes. The objective for the MPC may be to minimize a cost function that may comprise e.g. costs of energy consumption, costs of dosing substance(s) and costs related to the effluent quality (fee or threshold values).

The models can be linear or non-linear as well as time-invariant or time-varying. The MPC formulation may be able to deal with constraints related to output or states of the system (such as a concentration related constraint). The nonlinear model may be linearized to derive a Kalman filter. A Kalman filter is also known as linear quadratic estimation (LQE).

According to a second aspect, the invention provides a wastewater treatment system forming a treatment space connected to a sewer space for receiving wastewater from the sewer space and including a control structure for controlling fluid flow of the wastewater from the sewer space to the treatment space, the system comprising: [0093] a parameter structure configured to provide a treatment parameter significant for purification of the wastewater in the treatment space, [0094] a capacity structure configured to determine an actual spare plant capacity indicating an amount of wastewater which can be supplied to the treatment space, [0095] a volume structure configured to determine an actual spare wastewater storage volume indicating an amount of wastewater which can be retained in the sewer space, wherein the control structure is configured to varying the flow of the wastewater from the sewer space to the treatment space based on the treatment parameter, the actual spare plant capacity, and the actual spare sewer volume.

It should be understood, that a skilled person would readily recognise that any feature described in combination with the first aspect of the invention could also be combined with the second aspect of the invention, and vice versa.

The method according to the first aspect of the invention is very suitable in relation to the wastewater treatment system according to the second aspect of the invention. The remarks set forth above in relation to the method are therefore equally applicable in relation to the wastewater treatment system.

In one embodiment, the parameter structure configured to provide a treatment parameter significant for purification of the wastewater in the treatment space may comprise one or more measuring devices configured to measure the treatment parameter.

The parameter structure may further comprise a parameter processor configured to mathematically model at least one treatment parameter.

In one embodiment, the capacity structure configured to determine an actual spare plant capacity may comprise a plant processor configured to determine the actual spare plant capacity based on registration of and/or calculation of information obtained from the treatment space.

In one embodiment, the volume structure configured to determine an actual spare wastewater storage volume may comprise a storage processor configured to determine the actual spare wastewater storage volume based on registration of and/or calculation of information obtained from the sewer space.

It should be understood, that at least two of the parameter processor, the plant processor, and the storage processor may be a single processor configured to determine at least two of the treatment parameter, the actual spare capacity, and the actual spare wastewater storage volume.

In the context of the present invention, the term "processor" should be understood as a calculation unit which based on information input is able to provide an output which may be transferred to the control structure and used as basis for control steps carried out by use of the control structure.

At least one of the parameter processor, the plant processor, and the storage processor may form part of the control structure.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
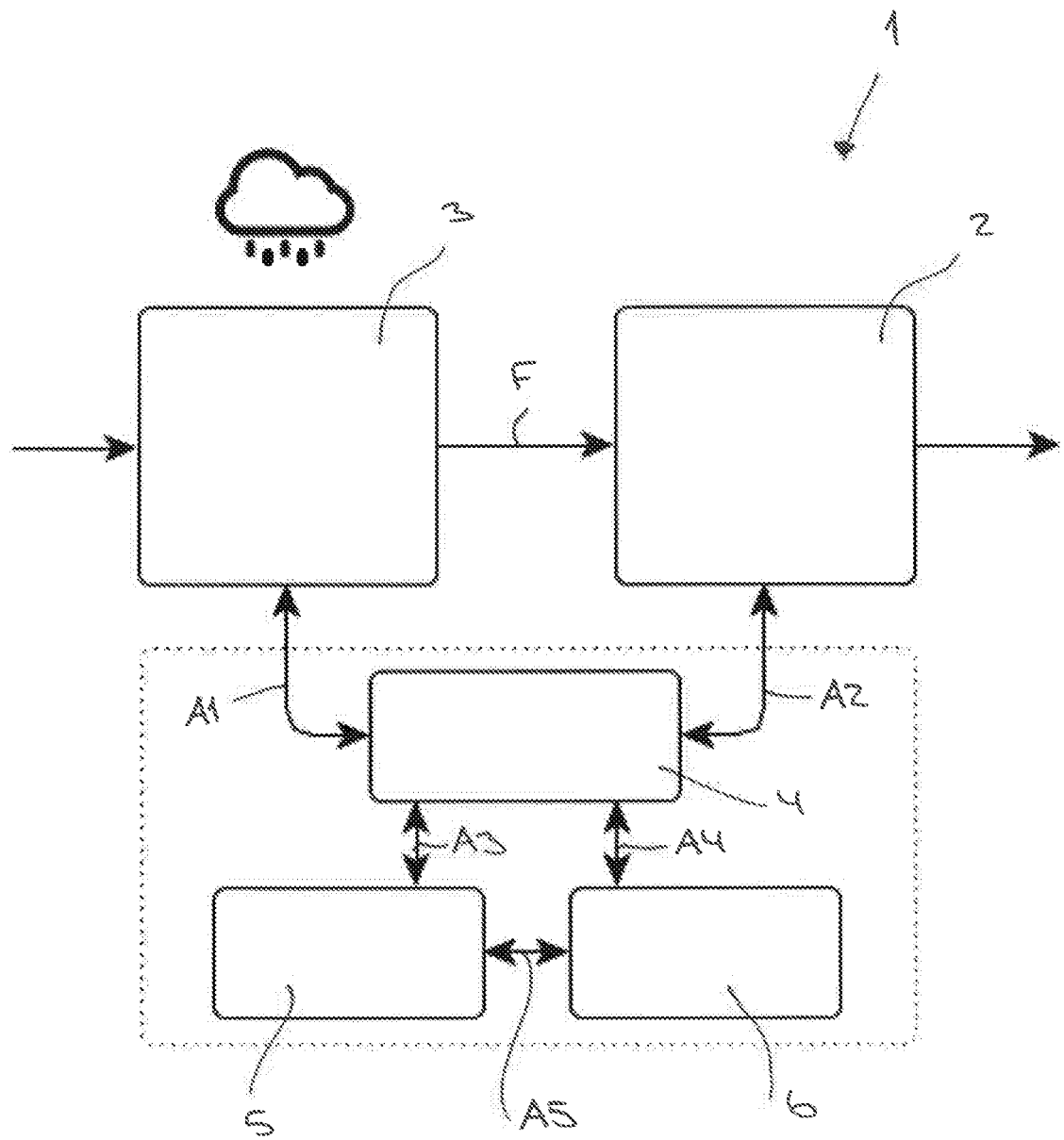
FIG. 1 schematically illustrates different features of an embodiment according to the invention.

FIG. 1 schematically illustrates different features of an embodiment of a wastewater system 1 according to the invention. The wastewater system 1 comprises a treatment plant 2 with a treatment space and being connected to a sewer system 3 comprising a sewer space. The treatment plant 2 is configured for receiving wastewater from the sewer system 3.

The wastewater system 1 further comprises a control structure 4 configured to control a fluid flow F of wastewater from the sewer system 3 to the treatment plant 2.

The wastewater system 1 comprises a parameter structure configured to provide a treatment parameter significant for purification of the wastewater in the treatment space, a capacity structure configured to determine an actual spare plant capacity indicating an amount of wastewater which can be supplied to the treatment space, and a volume structure configured to determine an actual spare wastewater storage volume indicating an amount of wastewater which can be retained in the sewer space.

The control structure 4 is configured to varying the flow F of the wastewater from the sewer system 3 to the treatment plant 2 based on the treatment parameter, the actual spare plant capacity and the actual spare sewer volume.

The control structure 4 may vary the flow by providing a signal to e.g. valves and/or pumps in the treatment plant 2 and/or the sewer system 3. Furthermore, the control structure 4 may base the control on information received from the treatment plant 2 and/or the sewer system 3. This is indicated by the arrows A1 and A2.

Furthermore, the control structure 4 may vary the flow F based on models 5, such as mathematical models and/or forecasts 6, such as whether forecasts and/or forecasts relating to occupancy behaviour. This is indicated by the arrows A3 and A4.

As illustrated by the arrow A5, forecast information may be included in the models, and oppositely.

Figure 2:
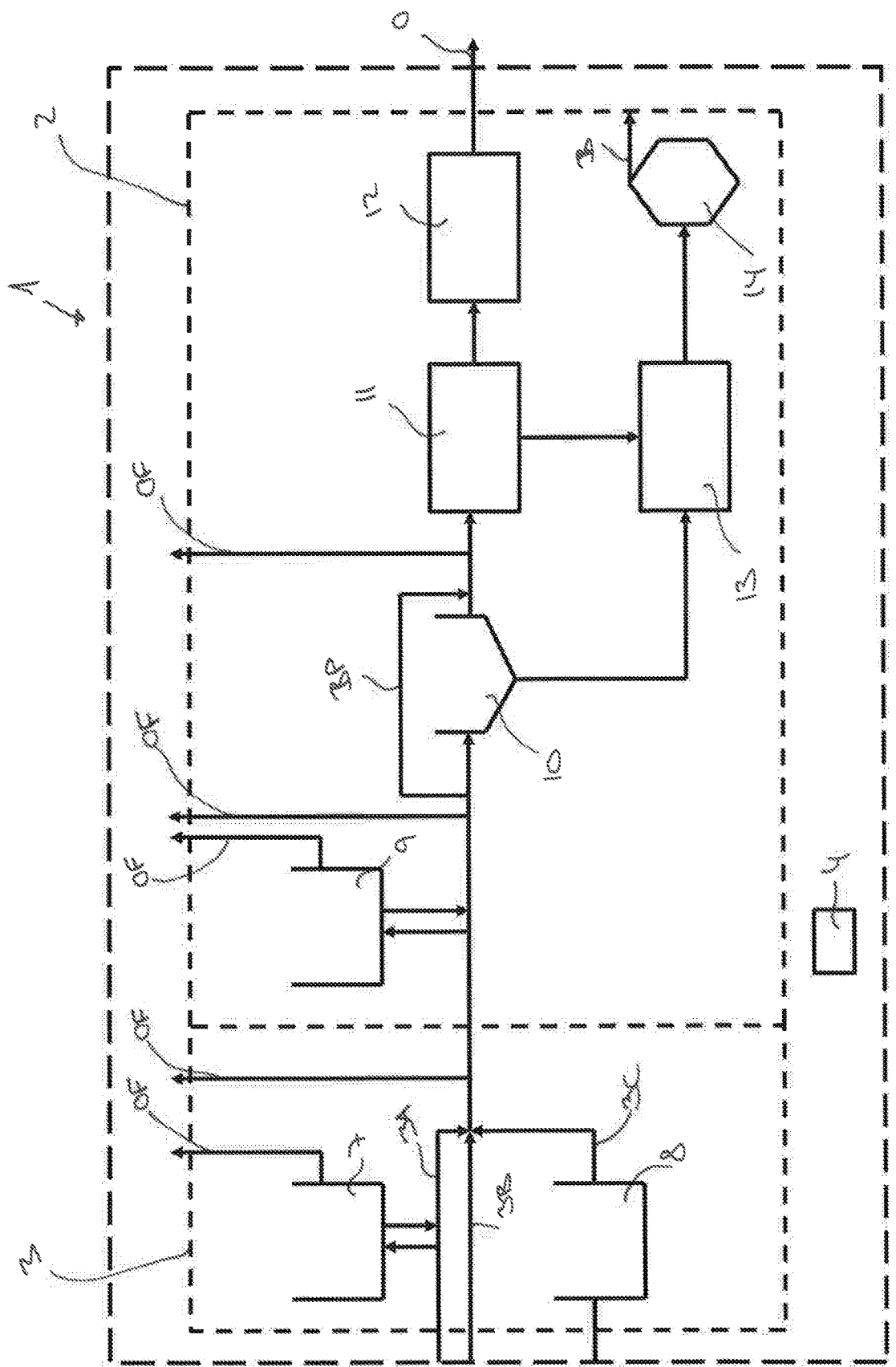
FIG. 2 illustrates an embodiment of a wastewater system according to the invention.

FIG. 2 illustrates an embodiment of a wastewater system 1 according to the invention.

The wastewater system 1 comprises a treatment plant 2 with a treatment space and being connected to a sewer system 3 comprising a sewer space. The treatment plant 2 is configured for receiving wastewater from the sewer system 3.

The wastewater system 1 further comprises a control structure 4 configured to control a fluid flow of wastewater from the sewer system 3 to the treatment plant 2.

The sewer system 3 comprises three sewer spaces 3A, 3B, 3C where one sewer space 3A comprises a detention tank 7, and the sewer space 3C comprises plurality of pipes 8 which may retain wastewater in the sewer system 3. For illustration purposes, the pipes 8 are illustrated as a tank.

In the illustrated embodiment, the treatment plant 2 comprises a retention tank 9 for storage of wastewater.

Furthermore, the illustrated embodiment of the wastewater system 1 comprises three treatment tanks, a primary treatment tank 10, a secondary treatment tank 11, and a tertiary treatment tank 12.

The primary treatment tank 10 may be a settling tank for settling sludge. Settled sludge may be directed to a sludge treatment tank 13. The treatment system may comprise a bypass structure for bypassing the primary treatment tank 10. The possibility of bypassing a part of the wastewater is indicated by the arrow BP. It should be understood, that the amount of wastewater bypassing the primary treatment tank 10 may be variable.

After settling of sludge in the settling tank 10, the wastewater is directed to the secondary treatment tank 11 for biological removal of nutrients. It should be understood that the secondary treatment tank 11 may comprise a two separate tanks; i.e. a process tank and a clarification tank. Sludge may be directed from the secondary treatment tank 11 to the sludge treatment tank 13.

After biological removal of nutrients in the secondary treatment tank 11, the wastewater may be directed to the tertiary treatment tank 12 for physical/chemical purification. Subsequently, the purified wastewater may be directed out of the treatment plant 2 via an outlet indicated by the arrow O.

After treatment of the sludge in the sludge treatment tank 13, the sludge may be directed to a digester 14 for production of biogas. After production of biogas, the gas may be directed out of the digester 14 as indicated by the arrow B. The biogas may be used for production of electricity and/or heat.

At different location in the wastewater system 1, overflow of wastewater may be possible. This is indicated by the arrows OF.

It should be understood, that the control structure 4 may also be configured for controlling other flows and/or different processes in the wastewater system 1. The processes may alternatively be controlled by another control structure or by a plurality of other control structures.

It should further be understood that the wastewater system 1 may comprise several elements which are not illustrated in FIGS. 1 and 2. As an example, the wastewater system 1 may comprise a plurality of pumps and valves, and may further comprise a screen, a grit and grease chamber, an aeration grid, filters, an aeration structure, a stirring structure, a sludge scraper, etc.

The invention claimed is:

1. A method of treating wastewater in a wastewater system; the wastewater system comprising a treatment plant comprising a treatment space and a sewer system comprising a sewer space, the treatment plant further comprising a treatment inlet for supplying wastewater to the treatment system from the sewer system; the method comprising the step of:
   providing a treatment parameter by continuous measurement, wherein the treatment parameter is selected from the group consisting of: Total-N, $NH_4$—N, $NH_4$—N+ $NO_3$—N, $N_2O$, Total-P, $PO_4$—P, COD (Chemical Oxygen Demand), BOD (Biochemical Oxygen Demand), TOC (Total Organic Carbon), TSS (Total Suspended Solids), MLSS (Mixed Liquor Suspended Solids), DO (Dissolved Oxygen), turbidity, OUR (Oxygen Uptake Rate), sludge blanket level, SVI (sludge volume index), sludge composition based on DNA sequencing technology, and combinations thereof, to thereby provide an online treatment parameter,
   determining an actual spare plant capacity indicating an amount of wastewater which can be supplied to the treatment space, wherein the step of determining the actual spare capacity is based on prediction of at least one of the amount of wastewater treated and the amount of wastewater supplied through the treatment inlet,
   determining an actual spare wastewater storage volume indicating an amount of wastewater which can be retained in the sewer space, and
   varying the amount of wastewater supplied through the treatment inlet to the treatment plant based on at least the treatment parameter, the actual spare plant capacity, and the actual spare wastewater storage volume.

2. A method according to claim 1, wherein the treating of the wastewater comprises at least one of biological and chemical removal of nutrients.

3. A method according to claim 1, wherein the step of varying the amount of wastewater supplied is carried out as rain strikes the treatment plant and surrounding areas and further comprising a step of continuing the step of varying the amount of wastewater supplied until the cessation of rain.

4. A method according to claim 1, wherein the step of varying the amount of wastewater supplied through the inlet is further based on energy consumption in the wastewater system.

5. A method according to claim 1, wherein the step of varying the amount of wastewater supplied through the inlet is further based on variable costs of energy consumption.

6. A method according claim 1, further comprising a step of monitoring effluent quality of the wastewater after treatment in the treatment plant, and wherein the step of varying the amount of wastewater supplied through the inlet is further based on the effluent quality.

7. A method according to claim 6, further comprising a step of determining a risk of exceeding an effluent threshold value, and wherein the step of varying the amount of wastewater supplied through the inlet is further based on the determined risk.

8. A method according to claim 1, wherein the treatment plant comprises a digester, and wherein the step of varying the amount of wastewater supplied through the inlet is further based on an amount of biogas produced in the digester.

9. A method according to claim 1, further comprising a step of dosing an amount of at least one substance to the treatment plant, and a step of determining the substance amount, wherein the step of varying the amount of wastewater supplied through the inlet is further based on the determined amount of the at least one substance.

10. A method according to claim 9, wherein the substance is selected from a group consisting of: precipitated chemical, iron, aluminium, carbon, polymer, nutrient, base, acid, and combinations thereof.

11. A method according to claim 1, further comprising a step of determining a risk of overflow in the wastewater system, and wherein the step of varying the amount of wastewater supplied through the inlet is further based on the determined risk.

12. A method according to claim 1, further comprising a step of mathematically modelling at least one of treatment parameter, actual spare plant capacity, and actual spare wastewater storage volume by use of a mathematical model, and wherein the step of varying the amount of wastewater supplied through the inlet is further based on the mathematical modelling.

13. A method according to claim 12, wherein the step of mathematically modelling the treatment parameter includes online measurements of the treatment parameter.

14. A method according to claim 12, wherein the step of mathematically modelling comprises a step of calibrating the mathematical model based on online measurements of the treatment parameter.

15. A method according to claim 1, wherein at least one of the steps of providing a treatment parameter, determining the actual spare plant capacity and determining the actual spare sewer volume is based on forecast information.

16. The method according to claim 15, wherein the forecast information is based on information from the group consisting of: information from one or more rain gauges, weather radar, weather forecasts, temperature, satellite data, one or more flow measurements in the sewer system, one or more signals from one or more pumping stations arranged in the sewer system, and combinations thereof.

17. A wastewater treatment system forming a treatment space connected to a sewer space for receiving wastewater from the sewer space and including a control structure for controlling fluid flow of the wastewater from the sewer space to the treatment space, the system comprising:
   a parameter structure configured to provide a treatment parameter by continuous measurement, wherein the treatment parameter is selected from the group consisting of:
   Total-N, $NH_4$—N, $NH_4$—N+$NO_3$—N, $N_2O$, Total-P, $PO_4$—P, COD (Chemical Oxygen Demand), BOD (Biochemical Oxygen Demand), TOC (Total Organic Carbon), TSS (Total Suspended Solids), MLSS (Mixed Liquor Suspended Solids), DO (Dissolved Oxygen), turbidity, OUR (Oxygen Uptake Rate), sludge blanket level, SVI (sludge volume index), sludge composition based on DNA sequencing analysis technology, and combinations thereof, to thereby provide an online treatment parameter,
   a capacity structure configured to determine an actual spare plant capacity indicating an amount of wastewater which can be supplied to the treatment space, wherein the actual spare capacity is based on prediction of a least one of the amount of wastewater treated and the amount of wastewater supplied through the treatment inlet,
   a volume structure configured to determine an actual spare wastewater storage volume indicating an amount of wastewater which can be retained in the sewer space, wherein
the control structure is configured to varying the flow of the wastewater from the sewer space to the treatment space based on at least the treatment parameter, the actual spare plant capacity, and the actual spare sewer volume.

18. A wastewater treatment system according to claim 17, wherein the parameter structure configured to provide a treatment parameter significant for treatment of the wastewater in the treatment space comprises one or more measuring devices configured to measure the treatment parameter.

19. A wastewater treatment system according to claim 18, wherein the parameter structure further comprises a parameter processor configured to mathematically model at least one treatment parameter.

20. A wastewater treatment system according to claim 17, wherein the capacity structure configured to determine an actual spare plant capacity comprises a plant processor configured to determine the actual spare plant capacity based on registration and/or calculation of information obtained from the treatment space.

21. A wastewater treatment system according to claim 17, wherein the volume structure configured to determine an actual spare wastewater storage volume comprises a storage processor configured to determine the actual spare wastewater storage volume based on registration and/or calculation of information obtained from the sewer space.

* * * * *